US012675027B2

(12) United States Patent
Deng

(10) Patent No.: US 12,675,027 B2
(45) Date of Patent: Jul. 7, 2026

(54) APERTURE ASSEMBLY, CAMERA MODULE, AND ELECTRONIC DEVICE

(71) Applicant: VIVO MOBILE COMMUNICATION CO., LTD., Dongguan (CN)

(72) Inventor: Qiong Deng, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 216 days.

(21) Appl. No.: 18/651,870

(22) Filed: May 1, 2024

(65) Prior Publication Data

US 2024/0280880 A1 Aug. 22, 2024

Related U.S. Application Data

(63) Continuation of application No. PCT/CN2022/129023, filed on Nov. 1, 2022.

(30) Foreign Application Priority Data

Nov. 5, 2021 (CN) .......................... 202111306713.7

(51) Int. Cl.
*G03B 9/06* (2021.01)
(52) U.S. Cl.
CPC ...................................... *G03B 9/06* (2013.01)
(58) Field of Classification Search
None
See application file for complete search history.

(56) References Cited

U.S. PATENT DOCUMENTS

| | | | |
|---|---|---|---|
| 4,319,821 A | 3/1982 | Tezuka et al. | |
| 7,918,617 B2 | 4/2011 | Kawamoto et al. | |
| 2010/0195182 A1 | 8/2010 | Kawamoto | |
| 2012/0287516 A1 * | 11/2012 | Nakajima ................ | G03B 9/06 |
| | | | 359/738 |
| 2018/0052382 A1 | 2/2018 | Themelis | |
| 2019/0373145 A1 * | 12/2019 | Yu ........................... | G02B 7/102 |
| 2020/0068100 A1 | 2/2020 | Kim | |
| 2020/0241387 A1 | 7/2020 | Seo et al. | |
| 2020/0301246 A1 | 9/2020 | Seo et al. | |
| 2020/0401014 A1 | 12/2020 | Seo et al. | |
| 2020/0409234 A1 | 12/2020 | Jun | |
| 2022/0382128 A1 | 12/2022 | Lee | |
| 2024/0264509 A1 * | 8/2024 | Deng ..................... | G02B 5/005 |

FOREIGN PATENT DOCUMENTS

| | | |
|---|---|---|
| CN | 1721968 A | 1/2006 |
| CN | 107765442 A | 3/2018 |
| CN | 110460764 A | 11/2019 |

(Continued)

*Primary Examiner* — Rodney E Fuller
(74) *Attorney, Agent, or Firm* — The Webb Law Firm

(57) ABSTRACT

An aperture assembly includes a driving mechanism, a support base, and a plurality of blades. A first light entering hole is disposed on the support base, all the plurality of blades are rotatably connected to the support base, the plurality of blades form a light transmission hole, the light transmission hole is in communication with the first light entering hole, and all the plurality of blades are connected to the driving mechanism. Driven by the driving mechanism, all the plurality of blades are rotatable relative to the support base, to adjust an amount of light entering the light transmission hole.

12 Claims, 13 Drawing Sheets

(56)           References Cited

FOREIGN PATENT DOCUMENTS

| | | | | | |
|---|---|---|---|---|---|
| CN | 110858870 | A | | 3/2020 | |
| CN | 111487835 | A | | 8/2020 | |
| CN | 111722453 | A | | 9/2020 | |
| CN | 112099225 | A | | 12/2020 | |
| CN | 112147772 | A | | 12/2020 | |
| CN | 112262566 | A | | 1/2021 | |
| CN | 112596321 | A | | 4/2021 | |
| CN | 113259545 | A | | 8/2021 | |
| CN | 113885271 | A | | 1/2022 | |
| JP | 2005309318 | A | | 11/2005 | |
| JP | 2021021846 | A | | 2/2021 | |
| KR | 20200112158 | A | * | 10/2020 | ............ H04N 23/55 |
| KR | 20210001635 | A | * | 1/2021 | ............ G03B 30/00 |

* cited by examiner

APERTURE ASSEMBLY, CAMERA MODULE, AND ELECTRONIC DEVICE

CROSS-REFERENCE TO RELATED APPLICATIONS

This application is a Bypass Continuation Application of International Patent Application No. PCT/CN2022/129023, filed Nov. 1, 2022, and claims priority to Chinese Patent Application No. 202111306713.7, filed Nov. 5, 2021, the disclosures of which are hereby incorporated by reference in their entireties.

BACKGROUND OF THE INVENTION

Field of the Invention

The present disclosure pertains to the field of electronic technologies, and in particular, to an aperture assembly, a camera module, and an electronic device.

Description of Related Art

With advances in science and technologies, electronic devices are becoming increasingly more popular. Electronic devices such as a mobile phone and a tablet computer have become indispensable electronic products in people's lives, and a photographing requirement for the electronic devices is becoming increasingly high.

SUMMARY OF THE INVENTION

According to a first aspect, an embodiment of the present disclosure provides an aperture assembly, including a driving mechanism, a support base, and a plurality of blades, where a first light entering hole is disposed on the support base, the plurality of blades are rotatably connected to the support base, the plurality of blades form a light transmission hole, the light transmission hole is in communication with the first light entering hole, and all the plurality of blades are connected to the driving mechanism; and driven by the driving mechanism, all the plurality of blades are rotatable relative to the support base, to adjust an amount of light entering the light transmission hole.

According to a second aspect, an embodiment of the present disclosure provides a camera module, including a housing, a lens assembly, and the foregoing aperture assembly; where the housing is provided with an accommodating space, the accommodating space is provided an opening, the lens assembly is disposed in the accommodating space and is directly opposite to the opening, and the aperture assembly is disposed between the lens assembly and the opening.

According to a third aspect, an embodiment of the present disclosure provides an electronic device, including the foregoing camera module.

BRIEF DESCRIPTION OF THE DRAWINGS

The foregoing and/or additional aspects and advantages of the present disclosure will become apparent and readily understood from the descriptions of embodiments with reference to the following accompanying drawings.

Figure 1:
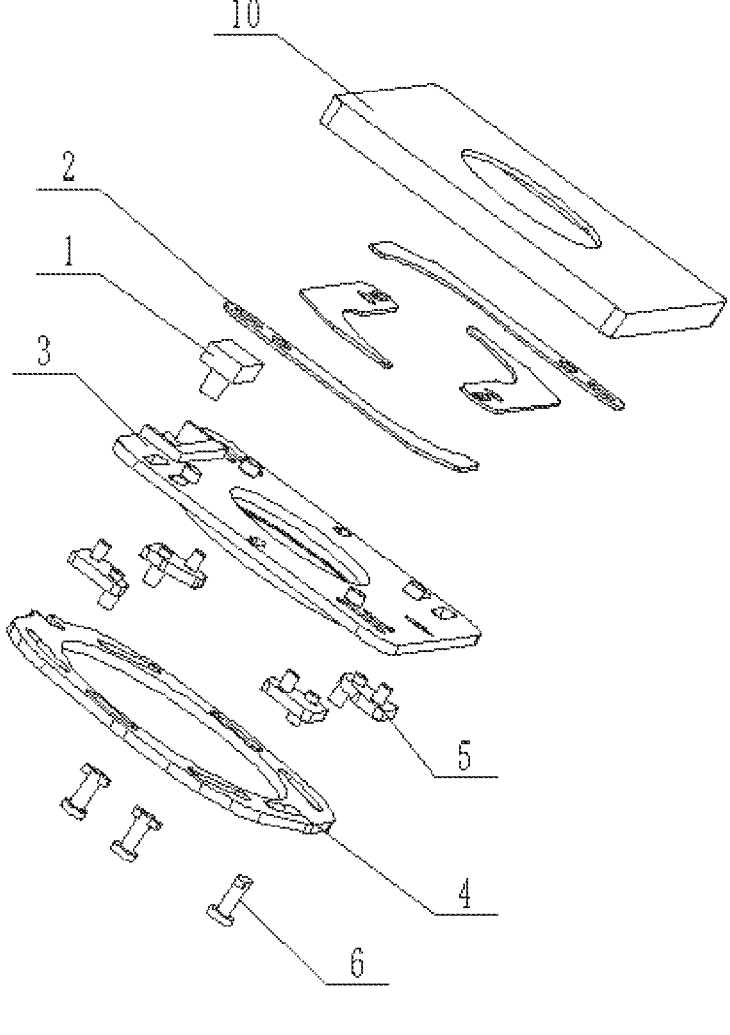
FIG. 1 is a schematic exploded diagram of an aperture assembly according to an embodiment of the present disclosure.

| Reference numerals: | |
| --- | --- |
| 1: Driving mechanism | 101: Magnetic coil |
| 102: Magnet | 2: Blade |
| 201: Fourth guide groove | 202: Light transmission hole |
| 203: Limiting hole | 3: Support base |
| 301: First light entering hole | 302: First guide groove |
| 303: Second guide groove | 304: Limiting post |
| 305: Fifth guide groove | 306: Mounting hole |
| 307: Annular guide rail | 4: Bracket |
| 401: Second light entering hole | 402: Third guide groove |
| 403: Sixth guide groove | 404: Mounting slot |
| 5: Slider | 501: First guide post |

3
-continued

Reference numerals:

502: Second guide post            503: Third guide post
6: Fastener                        7: Housing
8: Lens assembly                   801: Camera
9: Hall sensor                     10: Cover plate

DESCRIPTION OF THE INVENTION

Embodiments of the present disclosure are described in detail below. Examples of the embodiments are illustrated in the accompanying drawings. Reference numerals that are the same or similar throughout the accompanying drawings represent identical or similar elements or elements having identical or similar functions. The embodiments described below with reference to the accompanying drawings are examples and are merely used to explain the present disclosure without being construed as limitations on the present disclosure. All other embodiments obtained by a person of ordinary skill in the art based on the embodiments of the present disclosure shall fall within the protection scope of the present disclosure.

In descriptions of the present disclosure, it should be understood that features of terms "first" and "second" may explicitly or implicitly include one or more such features.

In the descriptions of the present disclosure, it should be noted that, unless otherwise specified and defined explicitly, the terms "mount", "connect", and "connection" should be understood in their general senses. For example, it may be a fixed connection, a detachable connection, or an integral connection, may be a mechanical connection or an electrical connection, or may be a direct connection, an indirect connection via an intermediate medium, or an internal communication between two elements. For persons of ordinary skill in the art, meanings of the foregoing terms in the present disclosure may be understood based on a situation.

A camera module is a component in an electronic device that implements a photographing function. An aperture of a conventional camera module is usually fixed. A larger aperture leads to a lighter depth of field, a larger amount of entering light, and an effect of clear foreground and blurred background in a photographed picture. A smaller aperture leads to a deeper depth of field, a smaller amount of entering light, and an effect of clear foreground and clear background in a photographed picture. A large aperture is particularly suitable for photographing an environment with dim light or a night scene. A size of the aperture of the conventional camera module is not adjustable, such that an amount of entering light cannot be continuously adjusted, and therefore, different requirements for the amount of entering light in a plurality of scenarios such as dark light and bright light cannot be met, thereby causing a poor photographing effect of the camera module.

An aperture assembly, a camera module, and an electronic device according to embodiments of the present disclosure are described below with reference to FIG. 1 to FIG. 19.

As shown in FIG. 1, FIG. 2, FIG. 3, and FIG. 8, the aperture assembly according to the embodiments of the present disclosure includes a driving mechanism 1, a support base 3, and a plurality of blades 2.

A first light entering hole 301 is disposed on the support base 3, all the plurality of blades 2 are rotatably connected to the support base 3, the plurality of blades 2 form a light transmission hole 202, the light transmission hole 202 is in communication with the first light entering hole 301, and all the plurality of blades 2 are connected to the driving mechanism 1.

Driven by the driving mechanism 1, all the plurality of blades 2 are rotatable relative to the support base 3, and an amount of light entering the light transmission hole 202 is adjusted through rotation of the plurality of blades 2.

Figure 2:
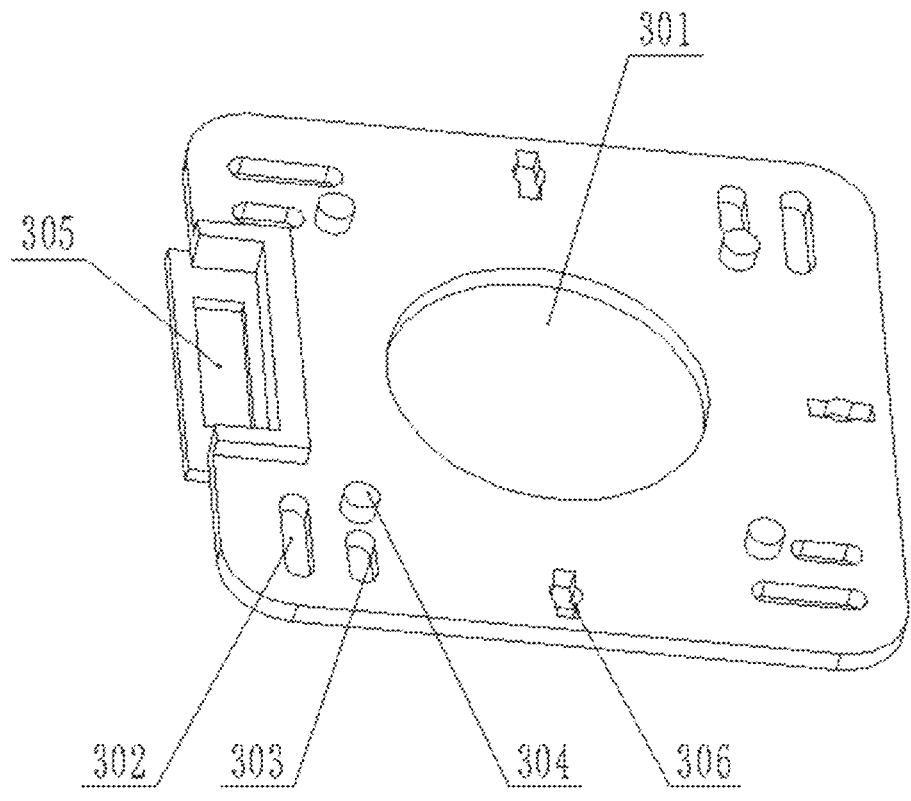
FIG. 2 is a first schematic diagram of a structure of a support base according to an embodiment of the present disclosure.
Figure 3:
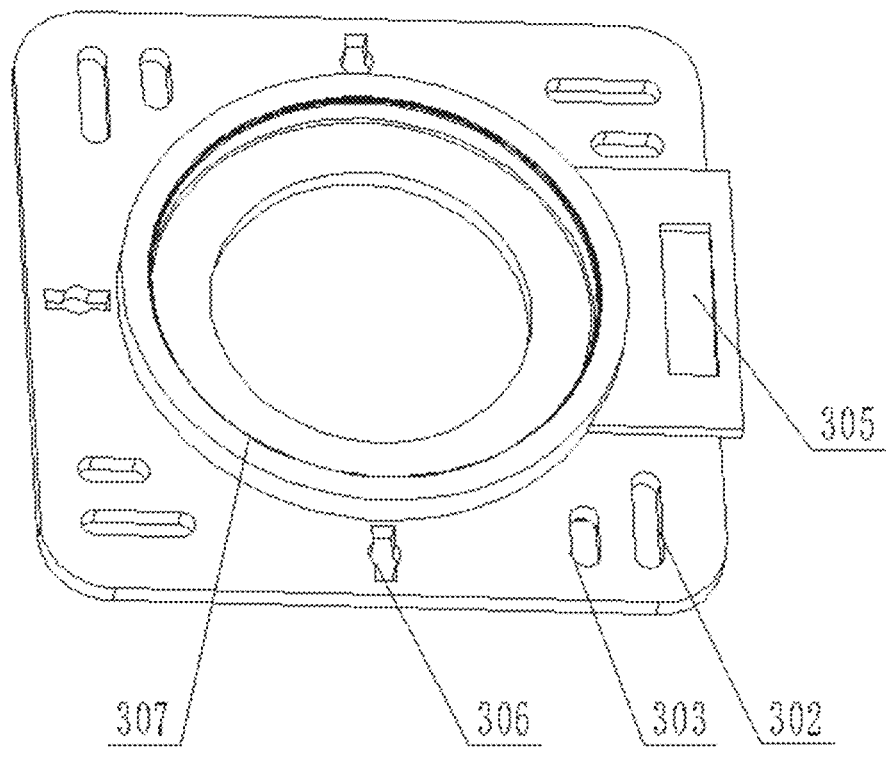
FIG. 3 is a second schematic diagram of a structure of a support base according to an embodiment of the present disclosure.

As shown in FIG. 2 and FIG. 3, the support base 3 may be a cuboid, a cylinder, or the like. A shape of the support base 3 is not limited herein. The first light entering hole 301 is disposed on the support base 3. For example, the first light entering hole 301 is circular, a size of the first light entering hole 301 is set based on an actual requirement, and light in an external environment can pass through the first light entering hole 301.

Figure 8:
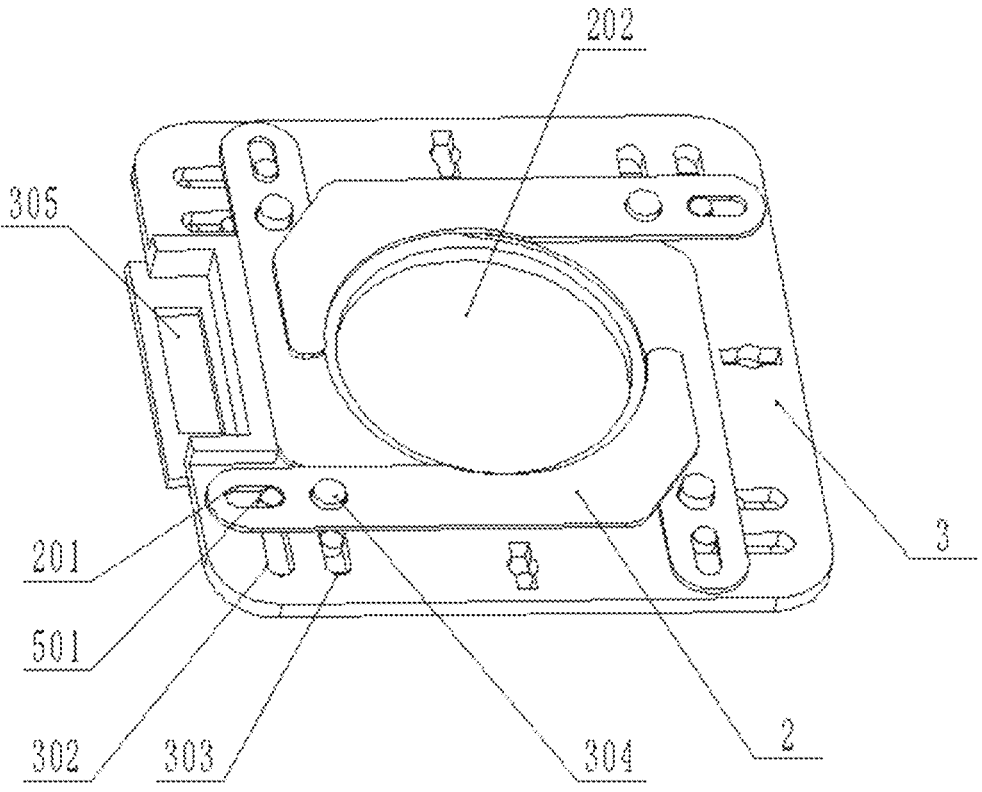
FIG. 8 is a schematic diagram of a partly assembled aperture assembly according to an embodiment of the present disclosure.

As shown in FIG. 8, the plurality of blades 2 may be rotatably connected to a side of the support base 3 by using a rotating shaft. The plurality of blades 2 are disposed uniformly in a circumferential direction of the support base 3. Each blade 2 may partially overlap an adjacent blade 2, and the plurality of blades 2 are enclosed to form the light transmission hole 202. The light transmission hole 202 is in communication with the first light entering hole 301, so that light in an external environment can pass through the light transmission hole 202 and the first light entering hole 301 in sequence. A quantity of blades 2 is set based on an actual requirement. For example, the support base 3 is a cuboid, and four blades 2 are distributed in a circumferential direction of a surface of the support base 3.

Figure 4:
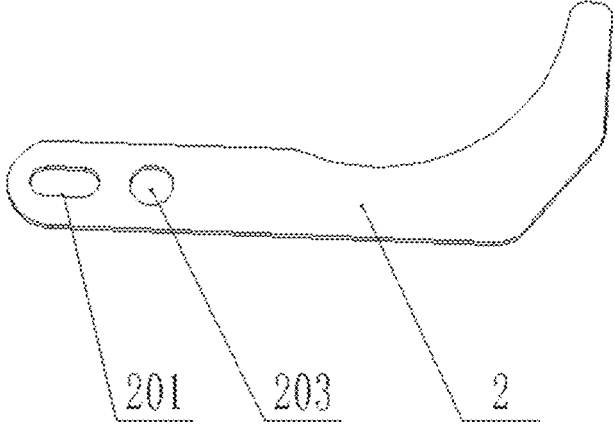
FIG. 4 is a schematic diagram of a structure of a blade according to an embodiment of the present disclosure.

As shown in FIG. 4, an inner side of one end of the blade 2 is disposed with an arc groove, and an axial line of an arc in which the arc groove is located is disposed coaxially with an axial line of the first light entering hole 301. The light transmission hole 202 formed by the plurality of blades 2 through enclosure is circular. It may be understood that, in a case that the plurality of blades 2 are not rotated, an amount of light entering the light transmission hole 202 formed through enclosure is the largest. The blade 2 is rotatable clockwise or counterclockwise relative to the support base 3. In a case that the blade 2 rotates clockwise, the amount of light entering the light transmission hole 202 gradually decreases, and in a case that the blade 2 rotates counterclockwise, the amount of light entering the light transmission hole 202 gradually increases. Alternatively, in a case that the blade 2 rotates clockwise, the amount of light entering the light transmission hole 202 gradually increases, and in a case that the blade 2 rotates counterclockwise, the amount of light entering the light transmission hole 202 gradually decreases. A quantity of blades 2 may be increased as much as possible, so that a shape of the light transmission hole 202 is closer to a circle.

All the plurality of blades 2 are connected to the driving mechanism 1. Driven by the driving mechanism 1, each blade 2 is rotatable relative to the support base 3, and the amount of light entering the light transmission hole 202 is adjusted through synchronous rotation of the plurality of blades 2, that is, a size of an aperture is changed, to change an amount of light passing through the first light entering hole 301.

For example, the plurality of blades 2 rotate counterclockwise relative to the support base 3, and the amount of light entering the light transmission hole 202 gradually decreases; or the plurality of blades 2 rotate clockwise relative to the support base 3, and the amount of light entering the light transmission hole 202 gradually increases. Light transmission holes 202 with different amounts of entering light may be obtained based on different rotation angles of the plurality of blades 2, that is, apertures of different sizes are obtained.

It should be noted that the aperture assembly may be applied to a camera module, and the aperture assembly is mounted on a light incident side of the camera module, so that light can be incident on a camera of the camera module through the aperture assembly, and the camera module collects and photographs an image.

Through rotation of the plurality of blades 2, the aperture assembly can be switched between different sizes of apertures. In a photographing process, a larger aperture leads to a lighter depth of field and an effect of clear foreground and blurred background in a photographed picture, and a smaller aperture leads to a deeper depth of field and an effect of clear foreground and clear background in a photographed picture. In addition, to ensure a sufficient amount of entering light in nighttime or an environment with dim light, a large aperture may be used, and the large aperture is particularly suitable for photographing an environment with dim light or a night scene. Therefore, a size of an aperture may be adjusted based on an external environment and a required picture effect, to adapt to photographing of a plurality of scenarios.

In some embodiments of the present disclosure, the plurality of blades 2 are rotatably connected to one side of the support base 3, and the plurality of blades 2 are enclosed to form the light transmission hole 202. The driving mechanism 1 drives the plurality of blades 2 to rotate synchronously, to continuously adjust an amount of light entering the light transmission hole 202 through rotation of the plurality of blades 2, thereby implementing continuous adjustment of the amount of entering light, flexibly adjusting a size of an aperture based on factors such as a requirement of a user or a change in a scenario, and meeting flexible control over the amount of entering light. In this way, photographing experience of the user is improved.

Figure 5:
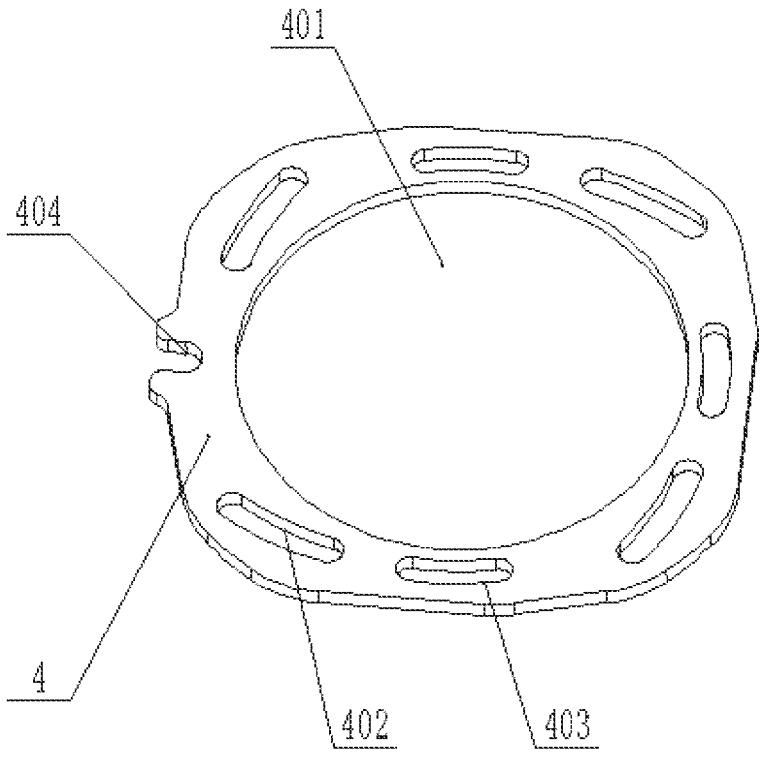
FIG. 5 is a schematic diagram of a structure of a bracket according to an embodiment of the present disclosure.

In one of the embodiments, as shown in FIG. 1 and FIG. 5, the aperture assembly further includes a bracket 4. A second light entering hole 401 is disposed on the bracket 4, the first light entering hole 301 is in communication with the second light entering hole 401, the driving mechanism is connected to the bracket 4, and all the plurality of blades 2 are connected to the bracket 4.

Driven by the driving mechanism, the bracket 4 is rotatable relative to the support base 3, and driven by the bracket 4, all the plurality of blades 2 is rotatable relative to the support base 3.

For example, the second light entering hole 401 is disposed at a middle location of the bracket 4, an axial line of the second light entering hole 401 is disposed coaxially with an axial line of the first light entering hole 301, and a size of an amount of light entering the second light entering hole 401 is equal to or greater than a size of the amount of light entering the first light entering hole 301.

It should be noted that the bracket 4 and the support base 3 overlap, and there is a gap between the bracket 4 and the support base 3. In a case that the plurality of blades 2 are located between the bracket 4 and the support base 3, the bracket 4 is rotatable clockwise or counterclockwise around the axial line of the second light entering hole 401 when driven by the driving mechanism 1, and all the plurality of blades 2 rotate clockwise or counterclockwise relative to the support base 3 when driven by the bracket 4. In this way, the size of the amount of light entering the light transmission hole 202 is adjusted.

Figure 6:
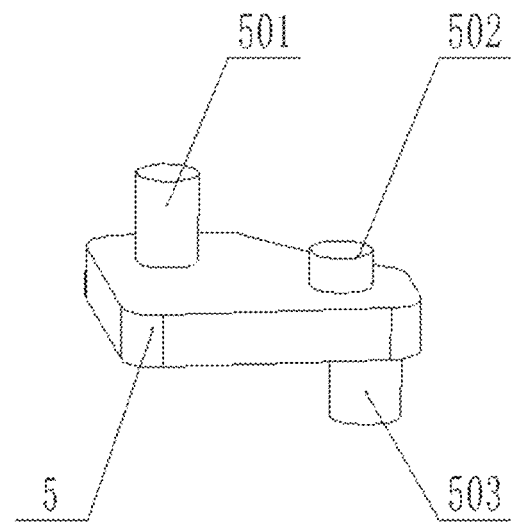
FIG. 6 is a schematic diagram of a structure of a slider according to an embodiment of the present disclosure.

In one of the embodiments, as shown in FIG. 1, FIG. 5, and FIG. 6, the aperture assembly further includes a plurality of sliders 5, and the sliders 5 are connected to the blades 2 in a one-to-one correspondence.

The bracket 4 is rotatably connected to a side of the support base 3 that is away from the blade 2, and the slider 5 is sandwiched between the bracket 4 and the support base 3.

Guide posts are disposed on two opposite sides of the slider 5, guide grooves are disposed on both the support base 3 and the bracket 4, and the guide grooves are adapted to the guide posts.

The guide post located on one side of the support base 3 passes through the guide groove on the support base 3 and is connected to the blade 2, and the guide post located on the other side of the support base 3 passes through the guide groove on the bracket 4.

Driven by the bracket 4, the slider 5 is movable relative to the support base 3, and driven by the slider 5, the blade 2 is rotatable relative to the support base 3.

As shown in FIG. 5, the bracket 4 is disposed on one side of the support base 3, the bracket 4 and the support base 3 are movably connected, the plurality of blades 2 are disposed on the other side of the support base 3, and light may pass through the light transmission hole 202, the first light entering hole 301, and the second light entering hole 401 in sequence.

As shown in FIG. 1 and FIG. 8, the slider 5 is sandwiched between the bracket 4 and the support base 3, and a quantity of sliders 5 is the same as a quantity of blades 2. For example, four blades 2 are uniformly arranged in a circumference direction of the support base 3, and locations of the four sliders 5 are in a one-to-one correspondence with locations of the four blades 2.

Driven by the driving mechanism 1, the bracket 4 is rotatable clockwise or counterclockwise around the axial line of the second light entering hole 401. Driven by the bracket 4, the slider 5 moves relative to the support base 3, and the slider 5 may be close to or away from an axis of the first light entering hole 301. Driven by the plurality of sliders 5, the plurality of blades 2 rotate clockwise or counterclockwise relative to the support base 3, to adjust the amount of light entering the light transmission hole 202.

In one of the embodiments, as shown in FIG. 2, FIG. 3, FIG. 5, and FIG. 6, the guide post includes a first guide post 501, a second guide post 502, and a third guide post 503, and the guide groove includes a first guide groove 302, a second guide groove 303, and a third guide groove 402.

As shown in FIG. 5, a third guide groove 402 is disposed on the bracket 4, and a first guide groove 302 and a second guide groove 303 are disposed on the support base 3.

As shown in FIG. 6, the first guide post 501 and the second guide post 502 are disposed on a side of the slider 5 facing the support base 3, the first guide post 501 is located on an outer side, the second guide post 502 is located on an inner side, a height of the first guide post 501 is greater than a height of the second guide post 502, and the third guide post 503 is disposed on a side of the slider 5 facing the bracket 4.

As shown in FIG. 2 and FIG. 3, in a case that there are four blades 2, four groups of guide grooves are uniformly disposed in the circumferential direction of the support base 3, each group of guide grooves includes one first guide groove 302 and one second guide groove 303, the first guide groove 302 is located on an outer side, the second guide groove 303 is located on an inner side, and a length of the first guide groove 302 is greater than a length of the first guide groove 302. Both the first guide groove 302 and the second guide groove 303 may be strip grooves. The strip groove enables the first guide post 501 to move in a straight line along the first guide groove 302, and enables the second guide post 502 to move in a straight line along the second guide groove 303.

As shown in FIG. 5, a third guide groove 402 is disposed on the bracket 4. In a case that there are four blades 2, four third guide grooves 402 are distributed in an array in a circumferential direction around the axial line of the second light entering hole 401. In a case that the bracket 4 rotates around the axial line of the second light entering hole 401, the third guide groove 402 rotates around the axial line of the second light entering hole 401. The third guide post 503 is movable in a straight line relative to the first guide groove 302 and the second guide groove 303.

As shown in FIG. 8, the first guide post 501 passes through the first guide groove 302 and is movable in a straight line along the first guide groove 302, the first guide post 501 is movably connected to the blade 2, and the first guide post 501 can drive the blade 2 to rotate. The second guide post 502 is located in the second guide groove 303, and a free end of the second guide post 502 is located below the blade 2, to avoid colliding with the blade 2 in a rotation process of the blade 2. The second guide post 502 moves in a straight line along the second guide groove 303. The third guide post 503 is located in the third guide groove 402, a surface of the third guide post 503 is in contact with a groove wall of the third guide groove 402, and the third guide post 503 moves along the third guide groove 402.

The driving mechanism 1 drives the bracket 4 to rotate around the axial line of the second light entering hole 401. The third guide groove 402 rotates around the axial line of the second light entering hole 401 with the bracket 4. In a rotation process of the third guide groove 402, the third guide groove 402 drives the third guide post 503 to move in a straight line in a direction parallel to the first guide groove 302 and the second guide groove 303. In this case, the first guide post 501 and the second guide post 502 may respectively move in a straight line along the first guide groove 302 and the second guide groove 303. The first guide post 501 drives the blade 2 to rotate.

In one of the embodiments, a distance between one end of the third guide groove 402 and the axis of the second light entering hole 401 is less than a distance between the other end of the third guide groove 402 and the axis of the second light entering hole 401, and a plurality of third guide grooves 402 are arranged in sequence along a circumferential direction of the second light entering hole 401.

As shown in FIG. 5, the third guide groove 402 is disposed on the bracket 4. In a case that there are four blades 2, four third guide grooves 402 are distributed in an array in a circumferential direction around the axial line of the second light entering hole 401, one end of the third guide groove 402 is close to the axis of the second light entering hole 401, and the other end of the third guide groove 402 is away from the axis of the second light entering hole 401, that is, a distance between one end of the third guide groove 402 and the axis of the second light entering hole 401 is less than a distance between the other end of the third guide groove 402 and the axis of the second light entering hole 401. Distances between the two ends of the third guide groove 402 and the axis of the second light entering hole 401 are different. In a case that the bracket 4 rotates around the axial line of the second light entering hole 401, the third guide groove 402 rotates around the axial line of the second light entering hole 401, and the third guide post 503 can perform linear motion relative to the first guide groove 302 and the second guide groove 303.

In one of the embodiments, the first guide groove 302 and the second guide groove 303 are disposed in parallel, two adjacent first guide grooves 302 are disposed perpendicular to each other, and two adjacent second guide grooves 303 are disposed perpendicular to each other.

Four groups of guide grooves uniformly disposed in the circumferential direction of the support base 3 are separately defined as a first group of guide grooves, a second group of guide grooves, a third group of guide grooves, and a fourth group of guide grooves. A direction of the first group of guide grooves is consistent with a direction of the third group of guide grooves, a direction of the second group of guide grooves is consistent with a direction of the fourth group of guide grooves, and a direction of the first group of guide grooves is perpendicular to a direction of the second group of guide grooves. Each group of guide grooves includes one first guide groove 302 and one second guide groove 303, and the first guide groove 302 and the second guide groove 303 are disposed in parallel.

In a case that there are four blades 2 and there are four sliders 5, the four sliders 5 corresponding to the first group of guide grooves, the second group of guide grooves, the third group of guide grooves, and the fourth group of guide grooves are separately defined as a first slider 5, a second slider 5, a third slider 5, and a fourth slider 5. The first slider 5 and the third slider 5 move in opposite directions, the second slider 5 and the fourth slider 5 move in opposite directions, and a moving direction of the first slider 5 and a moving direction of the second slider 5 are perpendicular to each other. In a process in which the four sliders 5 simultaneously move away from the axis of the second light entering hole 401, the amount of light entering the light transmission hole 202 gradually decreases, and in a process in which the four sliders 5 simultaneously move toward the axis of the second light entering hole 401, the amount of light entering the light transmission hole 202 gradually increases.

As shown in FIG. 4 and FIG. 8, in one of the embodiments, a fourth guide groove 201 is disposed on the blade 2, and the first guide post 501 passes through the first guide groove 302 and the fourth guide groove 201 in sequence.

For example, the fourth guide groove 201 is disposed on an end of the blade 2 that is away from the first light entering hole 301, the fourth guide groove 201 is a strip groove, and a direction of the fourth guide groove 201 is perpendicular to a direction of the first guide groove 302. The first guide post 501 passes through the first guide groove 302 and the fourth guide groove 201 in sequence, and a surface of the first guide post 501 is in contact with a groove wall of the fourth guide groove 201.

In a process in which the first guide post 501 moves in a straight line along the first guide groove 302, the surface of the first guide post 501 is in contact with the groove wall of the fourth guide groove 201, and abutting force between the first guide post 501 and the fourth guide groove 201 drives the blade 2 to rotate.

In one of the embodiments of the present disclosure, the fourth guide groove 201 is disposed on the blade 2, and the first guide post 501 passes through the first guide groove 302 and the fourth guide groove 201 in sequence, so that abutting force between the first guide post 501 and the fourth guide groove 201 drives the blade 2 to rotate, and a structure is simple and easy to implement.

In one of the embodiments, as shown in FIG. 1, the driving mechanism 1 includes an electromagnetic coil 101 and a magnet 102, and the magnet 102 is disposed on the bracket 4. In a case that the electromagnetic coil 101 is in an energized state, drive the bracket 4 is rotatable relative to the support base 3 driven by cooperation between the electromagnetic coil 101 and the magnet 102.

For example, the magnet 102 may be an electromagnetic iron or a permanent magnet, the magnet 102 is disposed on a side of the bracket 4, and the magnet 102 can drive the bracket 4 to rotate. In a case that a forward current is input into the electromagnetic coil 101, magnetic repulsion force between the electromagnetic coil 101 and the magnet 102 drives the magnet 102 to move in a straight line in one direction, and the magnet 102 drives the bracket 4 to rotate counterclockwise around the axial line of the second light entering hole 401. In a case that a reverse current is input into the electromagnetic coil 101, magnetic attraction force between the electromagnetic coil 101 and the magnet 102 drives the magnet 102 to move in a straight line in a reverse direction, and the magnet 102 drives the bracket 4 to rotate clockwise around the axial direction of the second light entering hole 401.

It may be understood that, in a case that a forward current is input into the electromagnetic coil 101, the magnet 102 can also drive the bracket 4 to rotate clockwise around the axial line of the second light entering hole 401. In a case that a reverse current is input into the electromagnetic coil 101, the magnet 102 drives the bracket 4 to rotate counterclockwise around the axial line of the second light entering hole 401.

In one of the embodiments of the present disclosure, when the electromagnetic coil 101 is in an energized state, magnetic repulsion force or magnetic attraction force between the electromagnetic coil 101 and the magnet 102 drives the magnet 102 to move in two opposite directions. The magnet 102 drives the bracket 4 to rotate counterclockwise or clockwise around the axial line of the second light entering hole 401, and the bracket 4 drives the blade 2 to rotate counterclockwise or clockwise by using the slider 5. In this way, the amount of light entering the light transmission hole 202 is adjusted.

Figure 7:
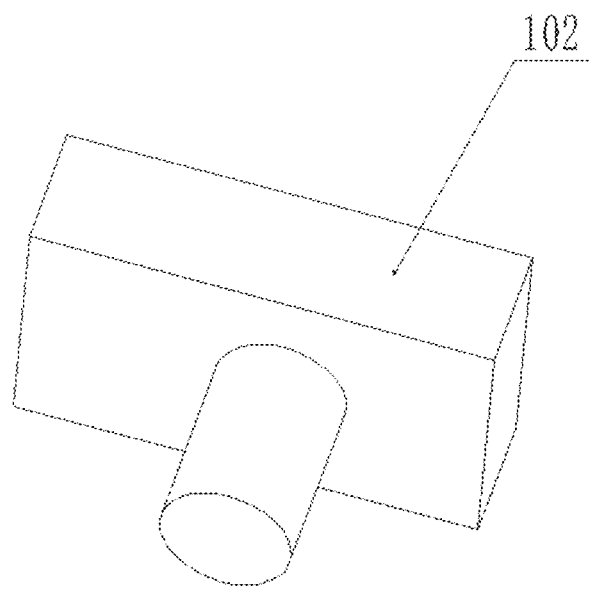
FIG. 7 is a schematic diagram of a structure of a magnet according to an embodiment of the present disclosure.
Figure 9:
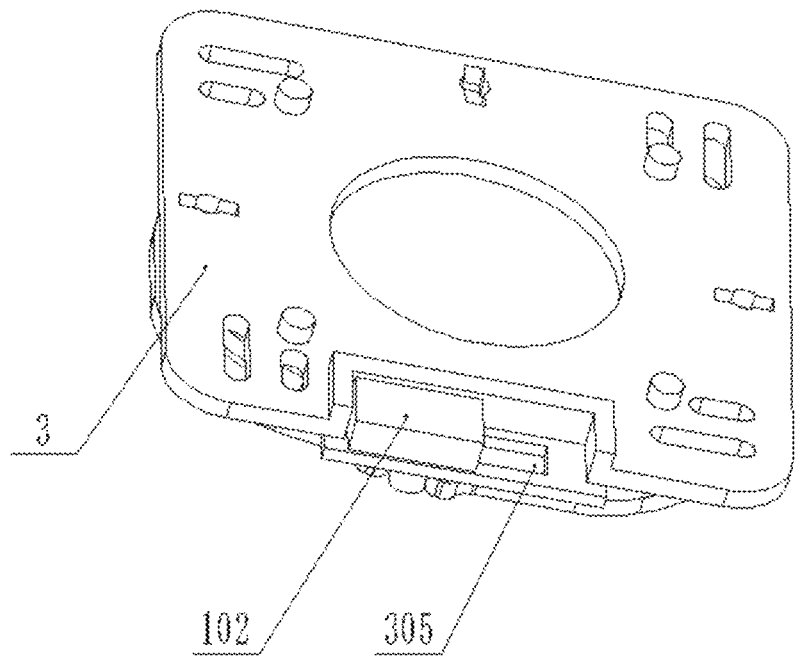
FIG. 9 is a first schematic assembly diagram of a magnet, a support base, and a bracket according to an embodiment of the present disclosure.
Figure 10:
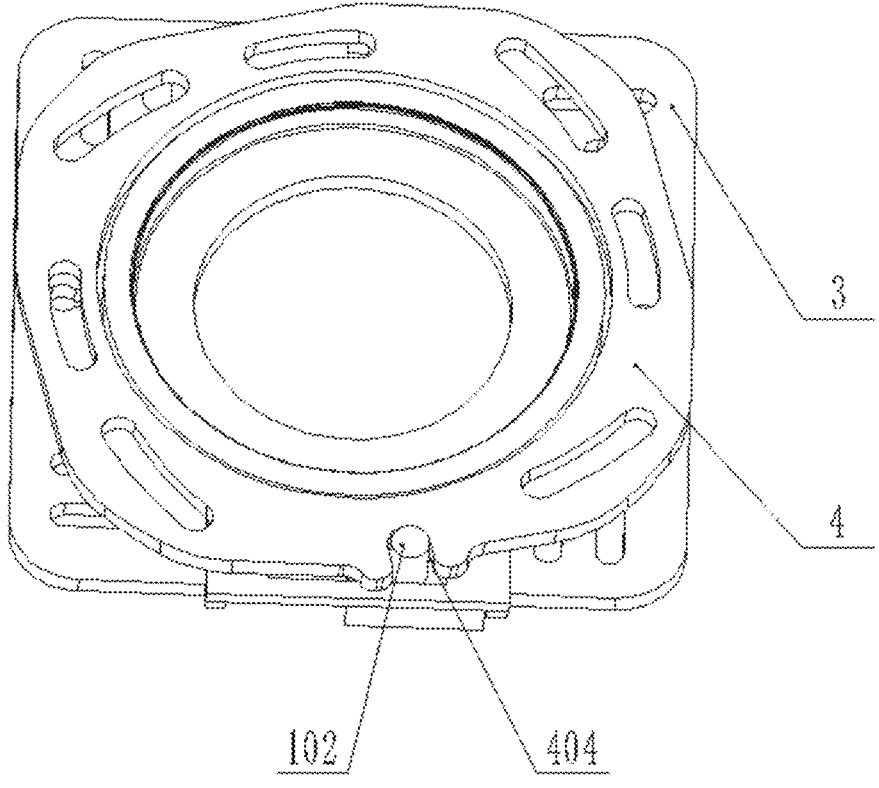
FIG. 10 is a second schematic assembly diagram of a magnet, a support base, and a bracket according to an embodiment of the present disclosure.

In one of the embodiments, as shown in FIG. 7, FIG. 9, and FIG. 10, the magnet 102 is slidably disposed on the support base 3, a protrusion part is disposed on one end of the magnet 102, a fifth guide groove 305 is disposed on the support base 3, the protrusion part passes through the fifth guide groove 305, a mounting groove 404 is disposed on an edge of the bracket 4, and the protrusion part is disposed in the mounting groove 404.

For example, a fifth guide groove 305 is disposed on one end of the support base 3, the fifth guide groove 305 is a strip groove, and the fifth guide groove 305 is parallel to the first guide groove 302. A protrusion part is disposed on one end of the magnet 102, the protrusion part may be columnar, and a size of the protrusion part is adapted to a size of the fifth guide groove 305. A mounting groove 404 is disposed on an edge of the bracket 4, and after the protrusion part passes through the fifth guide groove 305, a part of the protrusion part that is suspended out of the fifth guide groove 305 is located in the mounting groove 404, and a surface of a part of the protrusion part that is located in the mounting groove 404 abuts against a groove wall of the mounting groove 404.

In a case that the electromagnetic coil 101 is in an energized state, the protrusion part may move in a straight line along the fifth guide groove 305, so that the bracket 4 rotates counterclockwise or clockwise around the axial line of the second light entering hole 401 relative to the support base 3.

Figure 11:
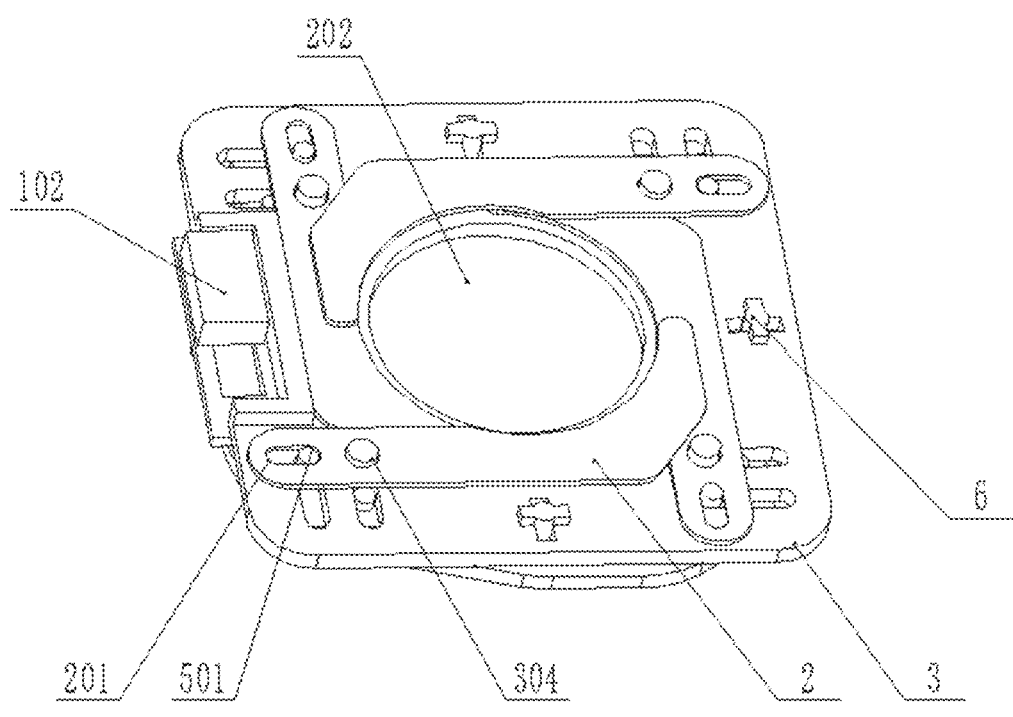
FIG. 11 is a first schematic diagram of a structure of an aperture assembly according to an embodiment of the present disclosure.
Figure 12:
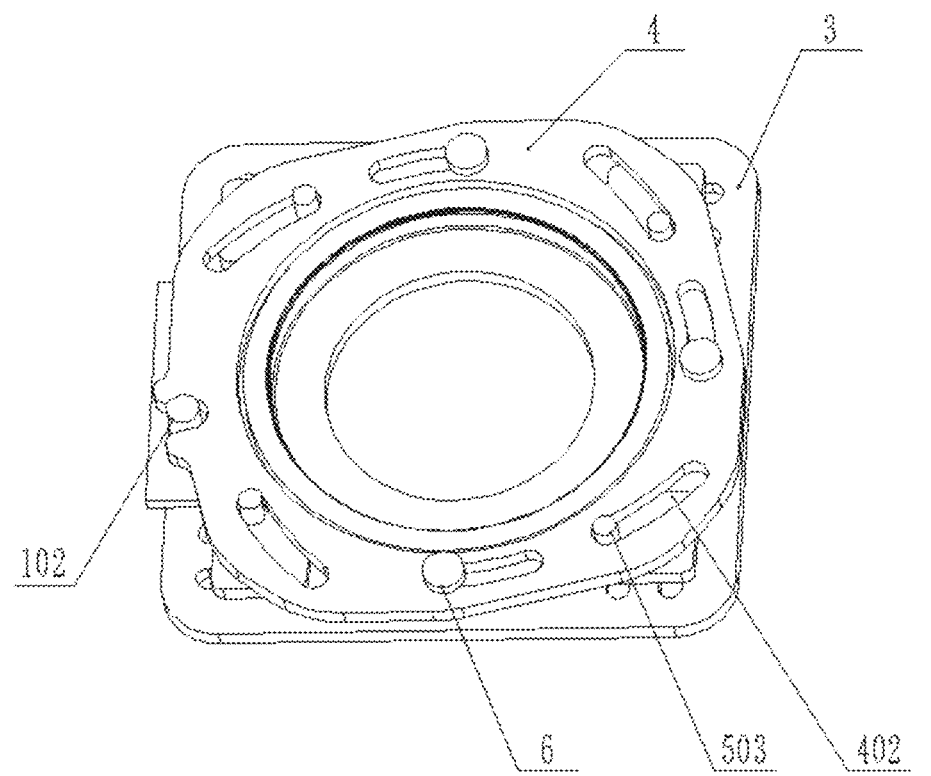
FIG. 12 is a second schematic diagram of a structure of an aperture assembly according to an embodiment of the present disclosure.

As shown in FIG. 11 and FIG. 12, in a case that the electromagnetic coil 101 is in a power-off state, the blade 2 does not rotate, and a size of the amount of light entering the light transmission hole 202 formed through enclosure of the plurality of blades 2 is the largest.

Figure 13:
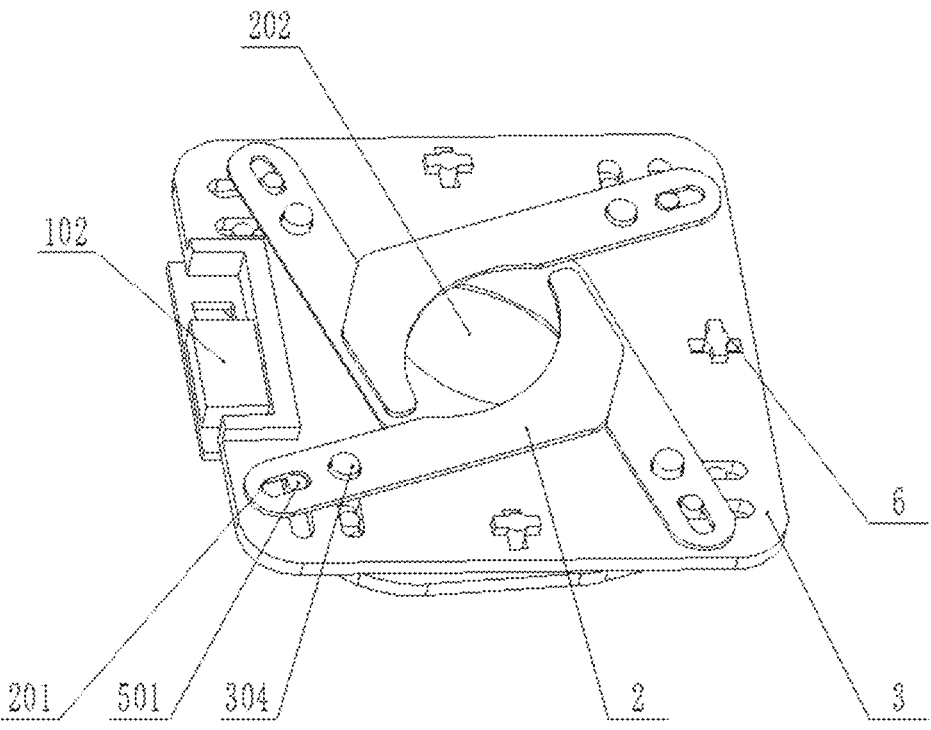
FIG. 13 is a first schematic diagram of a structure of an aperture assembly after a blade is rotated according to an embodiment of the present disclosure.
Figure 14:
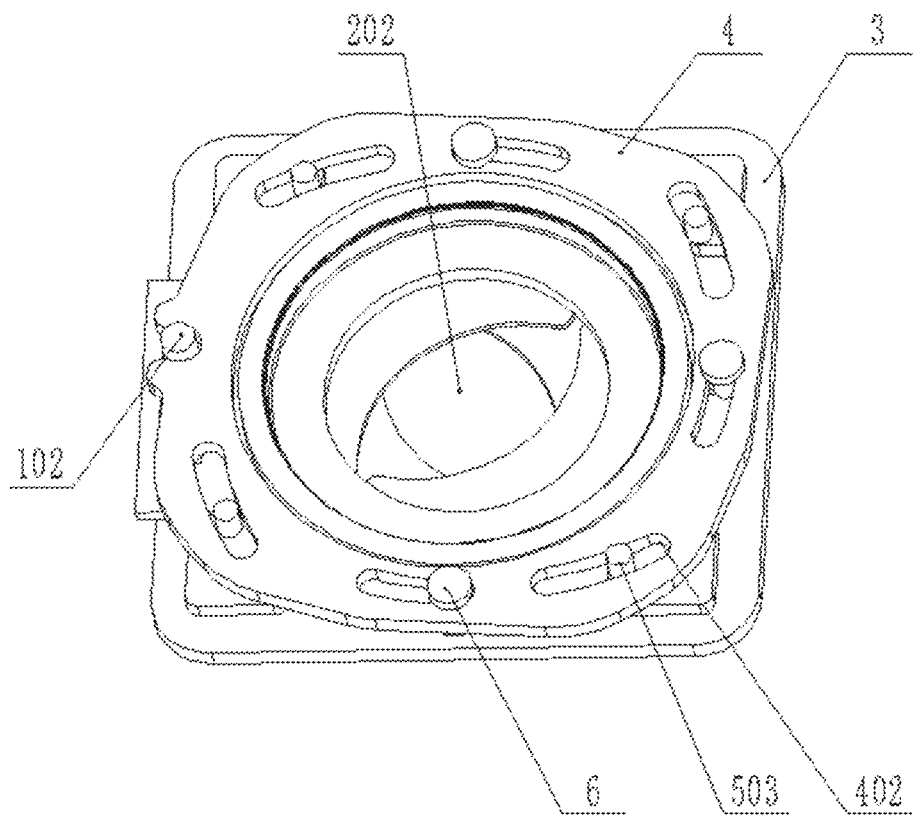
FIG. 14 is a second schematic diagram of a structure of an aperture assembly after a blade is rotated according to an embodiment of the present disclosure.

As shown in FIG. 13 and FIG. 14, in a case that the electromagnetic coil 101 is in an energized state, the protrusion part moves in a straight line along the fifth guide groove 305, the protrusion part drives the bracket 4 to rotate counterclockwise around the axial line of the second light entering hole 401, abutting force between the first guide post 501 and the fourth guide groove 201 drives the blade 2 to rotate, and the amount of light entering the light transmission hole 202 formed through enclosure of the plurality of blades 2 gradually decreases.

In one of the embodiments of the present disclosure, a fifth guide groove 305 is disposed on the support base 3, a mounting groove 404 is disposed on an edge of the bracket 4, and a protrusion part is disposed on one end of the magnet 102. After the protrusion part passes through the fifth guide groove 305, the protrusion part abuts against a groove wall of the mounting groove 404, and the protrusion part moves in a straight line along the fifth guide groove 305, to drive the bracket 4 to rotate counterclockwise or clockwise.

In one of the embodiments, as shown in FIG. 5, FIG. 11, and FIG. 12, a sixth guide groove 403 is further disposed on the bracket 4, and the sixth guide groove 403 is disposed on a same axis as the second light entering hole 401.

The aperture assembly further includes a fastener 6, a flange is disposed on one end of the fastener 6, the other end of the fastener 6 is connected to the support base 3, and the bracket 4 is disposed between the flange and the support base 3. The fastener 6 is disposed in the sixth guide groove 403 and is movable along the sixth guide groove 403.

For example, the sixth guide groove 403 is disposed on the bracket 4. The sixth guide groove 403 is an arc groove, an axis of an arc in which the arc groove is located is the same as the axis of the second light entering hole 401, and a quantity of sixth guide grooves 403 is set based on an actual requirement. For example, there may be three sixth guide grooves 403.

A middle part of the fastener 6 is columnar, a size of the columnar part is slightly smaller than a size of the sixth guide groove 403, a flange is disposed on one end of the fastener 6, and the other end of the fastener 6 is connected to the support base 3. A mounting hole 306 is disposed on the support base 3, and the mounting hole 306 may be a lock hole that is larger in the middle and smaller on both ends, and the other end of the fastener 6 is adapted to the mounting hole 306.

After the fastener 6 passes through the sixth guide groove 403 and the mounting hole 306 in sequence, the other end of the fastener 6 is rotated by 90 degrees, thereby implementing a connection between the support base 3 and the bracket 4. One end face of the flange is in contact with one side of the bracket 4 that is away from the support base 3. In a rotation process of the bracket 4, the sixth guide groove 403 forms an avoidance hole of the fastener 6.

In one of the embodiments of the present disclosure, the sixth guide groove 403 is disposed on a same axis as the second light entering hole 401, and the fastener 6 passes through the sixth guide groove 403 to connect to the support base 3, to implement a movable connection between the support base 3 and the bracket 4 by using the fastener 6 and the sixth guide groove 403.

In one of the embodiments, as shown in FIG. 3, an annular guide rail 307 is disposed on one side of the support base 3 facing the bracket 4, and the bracket 4 is sleeved on the annular guide rail 307.

For example, the annular guide rail 307 is disposed on one side of the support base 3 facing the support bracket 4, and an outer wall of the annular guide rail 307 is adapted to the second light entering hole 401. The bracket 4 is sleeved on the annular guide rail 307 by using the second light entering hole 401. In a process in which the bracket 4 rotates around the axial line of the second light entering hole 401, the outer wall of the annular guide rail 307 is adapted to the second light entering hole 401, to ensure that no deviation occurs on a center of rotation of the bracket 4, thereby improving rotation precision.

In one of the embodiments of the present disclosure, the annular guide rail 307 is disposed on one side of the support base 3 facing the bracket 4, and the bracket 4 is sleeved on the annular guide rail 307. This helps improve rotation precision of the bracket 4.

In one of the embodiments, as shown in FIG. 2, limiting posts 304 are disposed on one side of the support base 3, the limiting posts 304 are in a one-to-one correspondence with the blades 2, the blade 2 is sleeved on the limiting post 304, and the blade 2 is rotatable around the limiting post 304.

For example, the limiting posts 304 are disposed on one side of the support base 3 that is away from the bracket 4, the limiting posts 304 are disposed uniformly in a circumferential direction of the support base 3, and a quantity of limiting posts 304 is the same as a quantity of blades 2. A limiting hole 203 is disposed on one end of the blade 2, and the limiting hole 203 is adapted to the limiting post 304. The blade 2 is sleeved on the limiting post 304 by using the limiting hole 203, and the blade 2 rotates around the limiting post 304.

In one of the embodiments of the present disclosure, the blade 2 is sleeved on the limiting post 304 on the support base 3, and the blade 2 rotates around the limiting post 304, so that a structure is simple and easy to implement.

In one of the embodiments, as shown in FIG. 1, the aperture assembly further includes a cover plate 10. The cover plate 10 has an accommodating cavity, and parts such as the blade 2, a support base 3, and the bracket 4 are disposed in the accommodating cavity. The cover plate 10 can effectively prevent a part inside the aperture assembly from colliding with another part, to ensure security of the aperture assembly.

Figure 15:
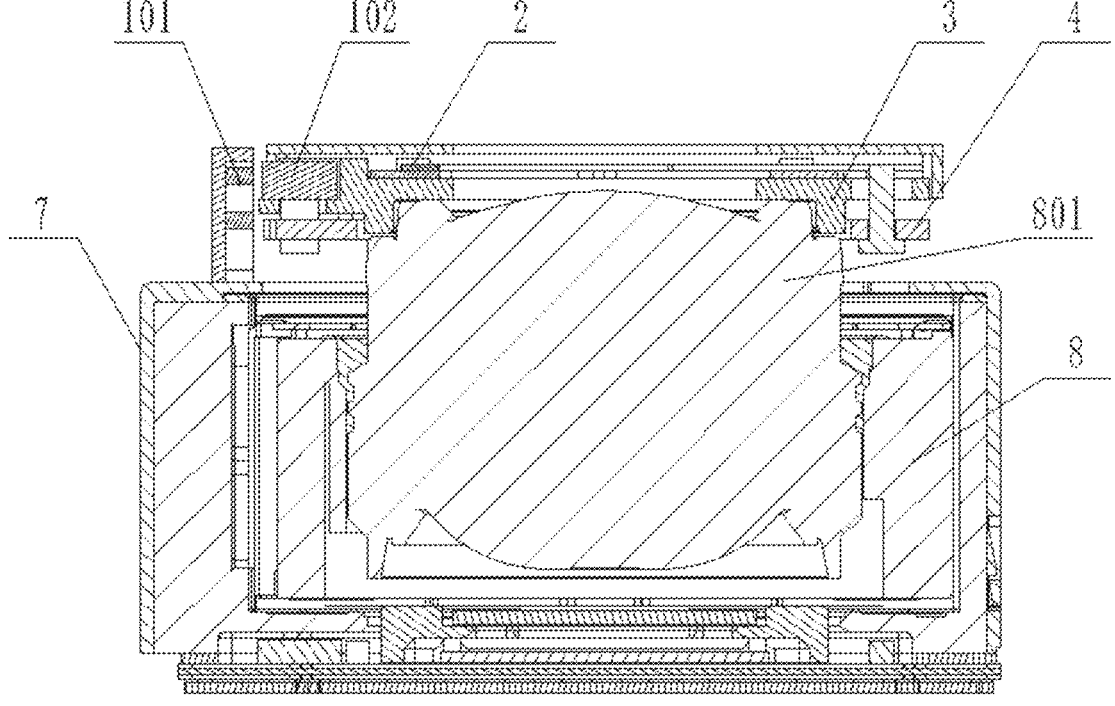
FIG. 15 is a schematic diagram of a structure of a camera module according to an embodiment of the present disclosure.
Figure 16:
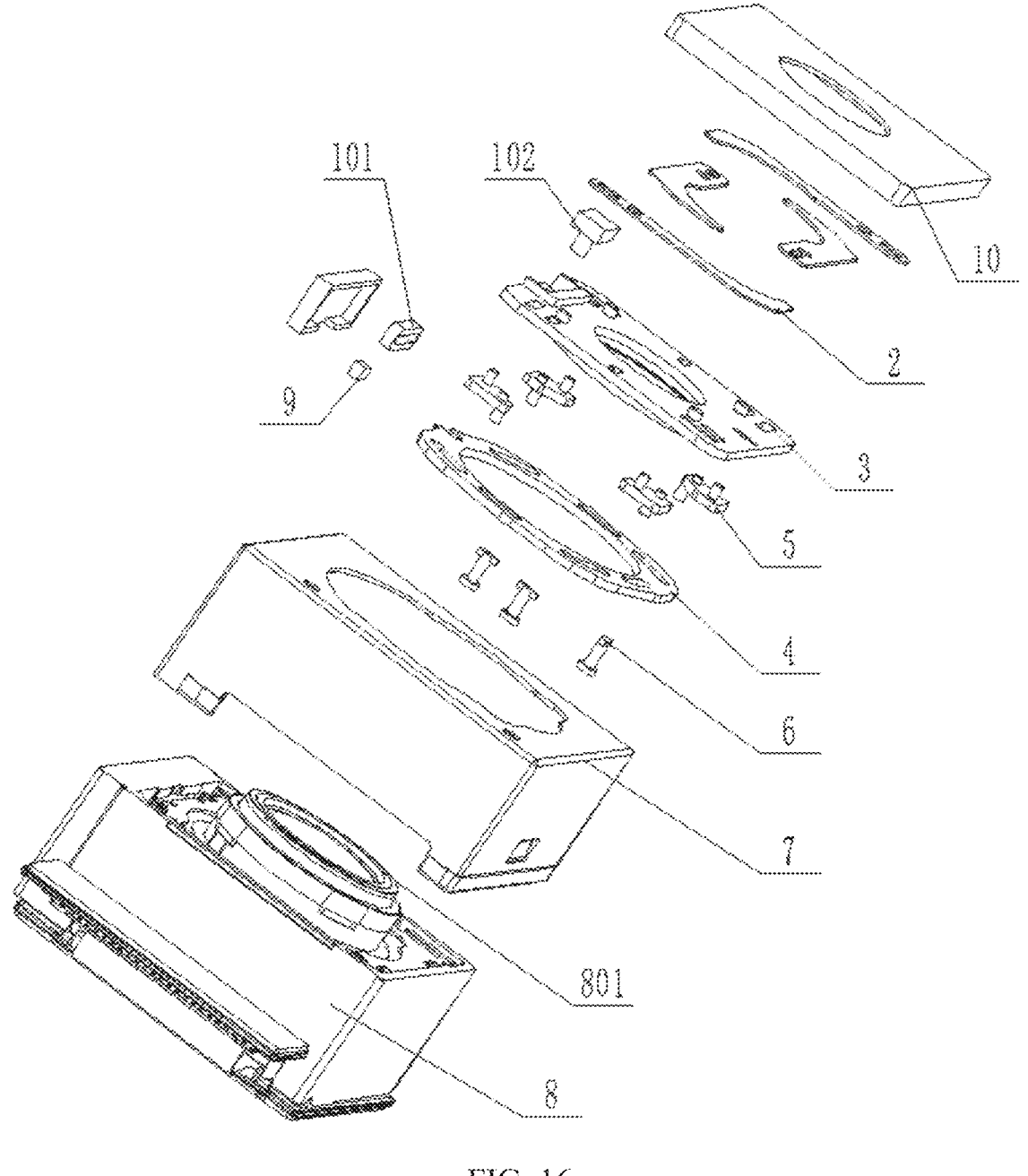
FIG. 16 is a schematic exploded diagram of a camera module according to an embodiment of the present disclosure.

As shown in FIG. 15 and FIG. 16, in addition, an embodiment of the present disclosure further provides a camera module, including a housing 7, a lens assembly 8, and the foregoing aperture assembly.

The housing 7 may be a square housing 7. The housing 7 is provided with accommodating space, one end of the accommodating space is provided with an opening, and the opening is adapted to the lens assembly 8. The lens assembly 8 is disposed in the accommodating space and is directly opposite to the opening, and the lens assembly 8 includes components such as a camera 801, an image sensor, a circuit board, and a sound coil motor.

The aperture assembly is disposed on an in-light surface of the lens assembly 8. For example, the aperture assembly is disposed above the lens assembly 8, that is, the aperture assembly is disposed between the lens assembly 8 and the opening, and an axial line of a first light entering hole 301 of a support base 3 is consistent with an axial line of an optical axis of the camera 801.

In one of the embodiments, an annular guide rail 307 is disposed on one side of the support base 3 facing a bracket 4, and an inner wall of the annular guide rail 307 may be bonded to a surface of the camera 801 by using glue, thereby implementing a fixed connection between the aperture assembly and the camera 801. During focusing, the aperture assembly may move up and down with the camera 801.

The aperture component adjusts an amount of light entering a light transmission hole 202, and may adjust an amount of light entering the camera 801 to photograph a plurality of scenarios and requirements.

In some of the embodiments, as shown in FIG. 15, in a case that a driving mechanism 1 includes an electromagnetic coil 101 and a magnet 102 and the magnet 102 is disposed on the bracket 4, the electromagnetic coil 101 is disposed in the accommodating space.

The camera module further includes a Hall sensor 9, configured to obtain magnetic field strength generated by the magnet 102, to determine a location of the magnet 102 on the support base 3.

For example, the electromagnetic coil 101 is disposed opposite to the magnet 102, and the electromagnetic coil 101 may be fastened in the accommodating space in a manner such as glue or a buckle. A fifth guide groove 305 is disposed on one end of the support base 3, a mounting groove 404 is disposed on an edge of the bracket 4, a protrusion part is disposed on one end of the magnet 102, and the protrusion part is in contact with a groove wall of the mounting groove 404 after passing through the fifth guide groove 305.

After the electromagnetic coil 101 is energized, magnetic force is generated, to drive the magnet 102 to move in a straight line along the fifth guide groove 305. The protrusion part on one end of the magnet 102 drives the bracket 4 to perform rotational movement, to drive the slider 5 to move in a straight line near or away from an axis of the first light entering hole 301. A slider 5 drives a blade 2 to perform clockwise rotation or counterclockwise rotation to adjust an amount of light entering the light transmission hole 202 through rotation of a plurality of blades 2.

Figure 17:
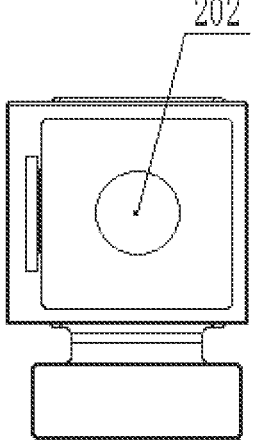
FIG. 17 is a first schematic diagram of an outline of a light transmission hole according to an embodiment of the present disclosure.
Figure 18:
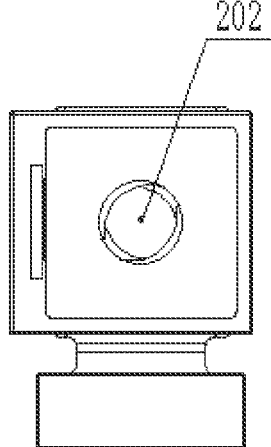
FIG. 18 is a second schematic diagram of an outline of a light transmission hole according to an embodiment of the present disclosure.
Figure 19:
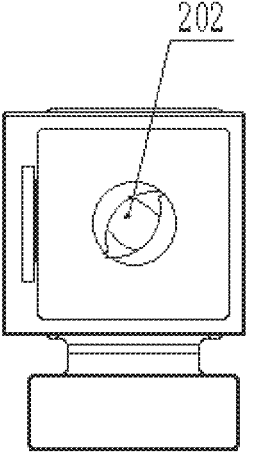
FIG. 19 is a third schematic diagram of an outline of a light transmission hole according to an embodiment of the present disclosure.

As shown in FIG. 17, FIG. 18, and FIG. 19, the magnet 102 moves to different locations along the fifth guide groove 305, and the slider 5 drives the blade 2 to rotate by different angles to adjust the amount of light entering the light transmission hole 202.

As shown in FIG. 16, the camera module further includes a Hall sensor 9. The Hall sensor 9 may be fastened to a side of the accommodating space by using a flexible circuit board. The Hall sensor 9 is disposed near the magnet 102. The Hall sensor 9 determines a location of the magnet 102 on the fifth guide groove 305 by obtaining the magnetic field strength generated by the magnet 102. A rotation angle of the blade 2 is determined based on different scenarios through software control, to implement fast switching between different sizes of apertures, thereby achieving a relatively good photographing effect.

In one of the embodiments of the present disclosure, the Hall sensor 9 determines a location of the magnet 102 by obtaining the magnetic field strength generated by the magnet 102, and may determine a rotation angle of the blade 2 based on different scenarios, to implement fast switching between different sizes of apertures, thereby achieving a relatively good photographing effect.

An embodiment of the present disclosure further provides an electronic device, including the camera module as described above.

The electronic device includes but is not limited to a mobile phone, a tablet computer, a laptop computer, a palmtop computer, an in-vehicle terminal, a wearable device, and the like. A type of the electronic device is not limited in this embodiment of the present disclosure.

It should be noted that an electronic device that uses the foregoing camera module may implement switching between different sizes of apertures based on different scenarios, to achieve a relatively good photographing effect.

In the descriptions of this specification, descriptions with reference to terms such as "one of the embodiments" means that features, structures, materials, or characteristics described in combination with the embodiments or examples are included in at least one embodiment or example of the present disclosure. In this specification, the foregoing example expressions of the terms are not necessarily with respect to a same embodiment or example. In addition, the described features, structures, materials, or characteristics may be combined in a proper manner in any one or more of the embodiments or examples.

Although the embodiments of the present disclosure have been illustrated and described, a person of ordinary skill in the art can understand that various changes, modifications, replacements, and variants may be made to these embodiments without departing from the principle and purpose of the present disclosure, and the scope of the present disclosure is limited by the claims and their equivalents.

What is claimed is:

1. An aperture assembly, comprising a driving mechanism, a support base, and a plurality of blades, wherein a first light entering hole is disposed on the support base, the plurality of blades are rotatably connected to the support base, the plurality of blades form a light transmission hole, the light transmission hole is in communication with the first light entering hole, and all the plurality of blades are connected to the driving mechanism; and driven by the driving mechanism, all the plurality of blades are rotatable relative to the support base, to adjust an amount of light entering the light transmission hole;

wherein the aperture assembly further comprises a bracket, a second light entering hole is disposed on the bracket, the first light entering hole is in communication with the second light entering hole, the driving mechanism is connected to the bracket, and all the plurality of blades are connected to the bracket; and driven by the driving mechanism, the bracket is rotatable relative to the support base, and driven by the bracket, all the plurality of blades are rotatable relative to the support base;

wherein the aperture assembly further comprises a plurality of sliders, and the sliders are connected to the blades in a one-to-one correspondence;

the bracket is rotatably connected to a side of the support base away from a blade, and a slider is sandwiched between the bracket and the support base;

guide posts are disposed on two opposite sides of the slider, a guide groove is disposed on each of the support base and the bracket, and the guide groove is adapted to a guide post;

the guide post located on one side of the support base passes through the guide groove on the support base and is connected to the blade, and the guide post located on another side of the support base passes through the guide groove on the bracket; and driven by the bracket, the slider is movable relative to the support base, and driven by the slider, the blade is rotatable relative to the support base.

2. The aperture assembly according to claim 1, wherein the guide post comprises a first guide post, a second guide post, and a third guide post, and the guide groove comprises a first guide groove, a second guide groove, and a third guide groove; and the first guide post and the second guide post are disposed on a side of the slider facing the support base, the third guide post is disposed on a side of the slider facing the bracket, the first guide groove and the second guide groove are disposed on the support base, and the third guide groove is disposed on the bracket; and the first guide post passes through the first guide groove and is movable along the first guide groove, the first guide post is movably connected to the blade, the second guide post is located in the second guide groove and is movable along the second guide groove, and the third guide post is located in the third guide groove and is movable along the third guide groove.

3. The aperture assembly according to claim 2, wherein a distance between one end of the third guide groove and an axis of the second light entering hole is less than a distance between another end of the third guide groove and the axis of the second light entering hole, and a plurality of third guide grooves are disposed along a circumferential direction of the second light entering hole in sequence.

4. The aperture assembly according to claim 2, wherein the first guide groove and the second guide groove are disposed in parallel, two adjacent first guide grooves are disposed perpendicular to each other, and two adjacent second guide grooves are disposed perpendicular to each other.

5. The aperture assembly according to claim 2, wherein a fourth guide groove is disposed on the blade, and the first guide post passes through the first guide groove and the fourth guide groove in sequence.

6. The aperture assembly according to claim 1, wherein the driving mechanism comprises an electromagnetic coil and a magnet, and the magnet is disposed on the bracket; and in a case that the electromagnetic coil is in an energized state, the bracket is rotatable relative to the support base driven by cooperation between the electromagnetic coil and the magnet.

7. A camera module, comprising a housing, a lens assembly, and an aperture assembly, wherein the housing is provided with an accommodating space, the accommodating space is provided with an opening, the lens assembly is disposed in the accommodating space and is directly opposite to the opening, and the aperture assembly is disposed between the lens assembly and the opening; and the aperture assembly comprises a driving mechanism, a support base, and a plurality of blades, wherein a first light entering hole is disposed on the support base, the plurality of blades are rotatably connected to the support base, the plurality of blades form a light transmission hole, the light transmission hole is in communication with the first light entering hole, and all the plurality of blades are connected to the driving mechanism; and driven by the driving mechanism, all the plurality of blades are rotatable relative to the support base, to adjust an amount of light entering the light transmission hole;

wherein the aperture assembly further comprises a bracket, a second light entering hole is disposed on the bracket, the first light entering hole is in communication with the second light entering hole, the driving mechanism is connected to the bracket, and all the plurality of blades are connected to the bracket; and driven by the driving mechanism, the bracket is rotatable relative to the support base, and driven by the bracket, all the plurality of blades are rotatable relative to the support base;

wherein the aperture assembly further comprises a plurality of sliders, and the sliders are connected to the blades in a one-to-one correspondence;

the bracket is rotatably connected to a side of the support base away from a blade, and a slider is sandwiched between the bracket and the support base;

guide posts are disposed on two opposite sides of the slider, a guide groove is disposed on each of the support base and the bracket, and the guide groove is adapted to a guide post;

the guide post located on one side of the support base passes through the guide groove on the support base and is connected to the blade, and the guide post located on another side of the support base passes through the guide groove on the bracket; and driven by the bracket, the slider is movable relative to the support base, and driven by the slider, the blade is rotatable relative to the support base.

8. The camera module according to claim 7, wherein the guide post comprises a first guide post, a second guide post, and a third guide post, and the guide groove comprises a first guide groove, a second guide groove, and a third guide groove; and the first guide post and the second guide post are disposed on a side of the slider facing the support base, the third guide post is disposed on a side of the slider facing the bracket, the first guide groove and the second guide groove are disposed on the support base, and the third guide groove is disposed on the bracket; and the first guide post passes through the first guide groove and is movable along the first guide groove, the first guide post is movably connected to the blade, the second guide post is located in the second guide groove and is movable along the second guide groove, and the third guide post is located in the third guide groove and is movable along the third guide groove.

9. The camera module according to claim 8, wherein a distance between one end of the third guide groove and an axis of the second light entering hole is less than a distance between another end of the third guide groove and the axis of the second light entering hole, and a plurality of third guide grooves are disposed along a circumferential direction of the second light entering hole in sequence.

10. The camera module according to claim 8, wherein the first guide groove and the second guide groove are disposed in parallel, two adjacent first guide grooves are disposed perpendicular to each other, and two adjacent second guide grooves are disposed perpendicular to each other.

11. The camera module according to claim 8, wherein a fourth guide groove is disposed on the blade, and the first guide post passes through the first guide groove and the fourth guide groove in sequence.

12. The camera module according to claim 7, wherein the driving mechanism comprises an electromagnetic coil and a magnet, and the magnet is disposed on the bracket; and in a case that the electromagnetic coil is in an energized state, the bracket is rotatable relative to the support base driven by cooperation between the electromagnetic coil and the magnet.

\* \* \* \* \*